US012456574B2

(12) United States Patent
Nishimura et al.

(10) Patent No.: US 12,456,574 B2
(45) Date of Patent: Oct. 28, 2025

(54) COIL DEVICE

(71) Applicant: IHI Corporation, Tokyo (JP)

(72) Inventors: Kenji Nishimura, Tokyo (JP); Susumu Tokura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 146 days.

(21) Appl. No.: 18/282,065

(22) PCT Filed: Feb. 1, 2022

(86) PCT No.: PCT/JP2022/003832
§ 371 (c)(1),
(2) Date: Sep. 14, 2023

(87) PCT Pub. No.: WO2022/219882
PCT Pub. Date: Oct. 20, 2022

(65) Prior Publication Data
US 2024/0153698 A1 May 9, 2024

(30) Foreign Application Priority Data

Apr. 13, 2021 (JP) ................................. 2021-067586

(51) Int. Cl.
H01F 38/14 (2006.01)
B60L 53/12 (2019.01)
B60L 53/30 (2019.01)
H01F 27/02 (2006.01)

(52) U.S. Cl.
CPC ............. H01F 38/14 (2013.01); B60L 53/12 (2019.02); B60L 53/30 (2019.02); H01F 27/02 (2013.01)

(58) Field of Classification Search
None
See application file for complete search history.

(56) References Cited

U.S. PATENT DOCUMENTS

| 2011/0231029 A1* | 9/2011 | Ichikawa | B60L 50/16 320/108 |
| 2013/0181667 A1* | 7/2013 | Takeshita | B60L 53/12 320/108 |
| 2017/0288465 A1 | 10/2017 | Sugasawa et al. | |
| 2018/0158599 A1 | 6/2018 | Kamikihara | |
| 2020/0139828 A1* | 5/2020 | Laemmle | H02J 50/005 |

FOREIGN PATENT DOCUMENTS

| CN | 118405010 A | * | 7/2024 | |
| CN | 119095740 A | * | 12/2024 | ............ B60G 17/00 |
| DE | 102011014752 A1 | | 9/2012 | |
| DE | 102019212277 | | 5/2020 | |
| JP | 2011050163 A | | 3/2011 | |

(Continued)

Primary Examiner — Kenneth Bukowski
(74) Attorney, Agent, or Firm — Volpe Koenig

(57) ABSTRACT

A coil device includes a main unit in which a coil that wirelessly transmits or receives electric power is accommodated in a main housing fixed to an installation target, and a sub-unit in which an electrical function unit that provides the main unit with an electrical function performed by at least one of an electric component and an electronic component is accommodated in a sub-housing detachably configured to be attached to the main housing. The main unit includes an accommodation portion that detachably accommodates the sub-unit.

6 Claims, 18 Drawing Sheets

(56) References Cited

FOREIGN PATENT DOCUMENTS

| | | | |
|---|---|---|---|
| JP | 2015-176898 A | 10/2015 | |
| JP | 2015-186410 A | 10/2015 | |
| JP | 2016-103645 A | 6/2016 | |
| JP | 2016119784 A * | 6/2016 | |
| JP | 2017-126596 A | 7/2017 | |
| JP | 2017-184440 A | 10/2017 | |
| JP | 2018-093690 A | 6/2018 | |
| WO | WO-2012119688 A2 * | 9/2012 | ............ B60L 11/182 |
| WO | 2016/143341 A1 | 9/2016 | |

* cited by examiner

COIL DEVICE

TECHNICAL FIELD

The present disclosure relates to a coil device.

BACKGROUND ART

Techniques for wirelessly transmitting or receiving electric power have been studied. A device that wirelessly transmits or receives electric power is referred to as a so-called wireless power supply device. The wireless power supply device includes a coil device as a component that transmits or receives electric power. When AC power is provided to a coil provided in a power transmission-side device, as a result, an electromagnetic field is generated around the coil. When the electromagnetic field reaches a power reception-side device, as a result, an induced electric current is generated in a power reception-side coil.

Patent Literatures 1 and 2 disclose coil devices. For example, Patent Literature 1 discloses a coil unit used in a wireless power supply device. The wireless power supply device of Patent Literature 1 uses an induced electromotive force generated by mutual induction between coils disposed to face each other. Patent Literature 1 discloses a pair of the coil units that allow electric power to be wirelessly supplied from a power transmission side to a power reception side.

CITATION LIST

Patent Literature

Patent Literature 1: Japanese Unexamined Patent Publication No. 2015-176898
Patent Literature 2: Japanese Unexamined Patent Publication No. 2015-186410

SUMMARY OF INVENTION

Technical Problem

The coil device used for wireless power transmission and power reception is installed at various places. For example, the coil device may be installed on a ground surface. In this case, it can be considered that the coil device is trampled by a car or is affected by the weather. Even under such conditions, maintaining a usable state for a long period of time is required for the coil device. Therefore, in order to maintain the coil device in a usable state for a long period of time, maintenance work such as replacing components constituting the coil device as needed is required.

Therefore, an object of the present disclosure is to provide a coil device that is easy to maintain.

Solution to Problem

A coil device according to one aspect of the present disclosure includes: a main unit in which a coil that wirelessly transmits or receives electric power is accommodated in a main housing fixed to an installation target. The coil device according to one aspect of the present disclosure includes: a sub-unit in which an electrical function unit that provides the main unit with an electrical function performed by at least one of an electric component and an electronic component is accommodated in a sub-housing detachably configured to be attached to the main housing. The main unit includes an accommodation portion that detachably accommodates the sub-unit.

Effects of Invention

According to the present disclosure, the coil device that is easy to maintain is provided.

DESCRIPTION OF EMBODIMENTS

Figure 1:
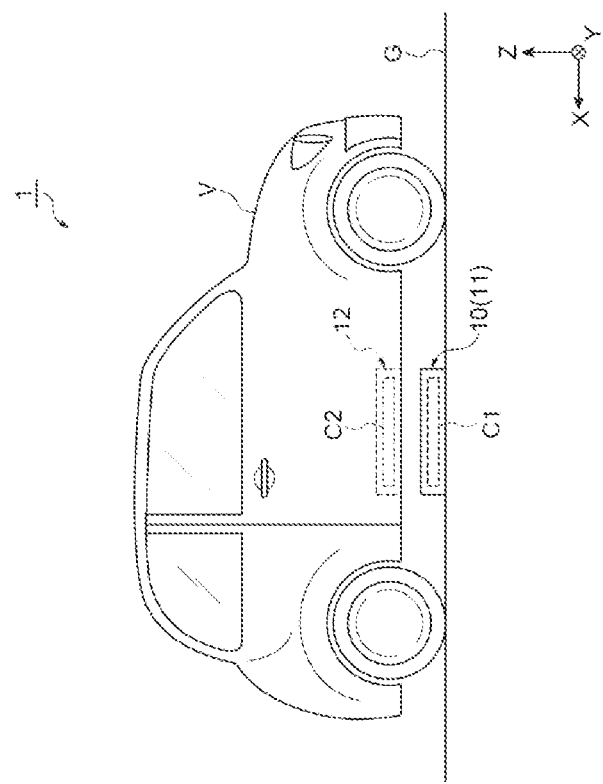
FIG. 1 is a side view illustrating a wireless power supply system including a coil device according to one embodiment.

A coil device according to one aspect of the present disclosure includes: a main unit in which a coil that wirelessly transmits or receives electric power is accommodated in a main housing fixed to an installation target. The coil device according to one aspect of the present disclosure includes: a sub-unit in which an electrical function unit that provides the main unit with an electrical function performed by at least one of an electric component and an electronic component is accommodated in a sub-housing detachably configured to be attached to the main housing. The main unit includes an accommodation portion that detachably accommodates the sub-unit.

In the coil device, the electrical function unit including a plurality of the electric components and/or the electronic components is accommodated in the sub-housing. Then, the sub-housing is detachably accommodated in the main housing that accommodates the coil. According to this configuration, the electrical function unit can be removed by removing the sub-housing from the main housing. Namely, there is no need to open the main housing accommodating the coil, in order to remove the electrical function unit. Therefore, the coil device is easy to maintain.

The main housing of the coil device according to one aspect may include a main base fixed to the installation target, and a main cover forming a region for accommodating the coil, together with the main base. The accommodation portion may be a depression including an opening formed in the main cover. According to this configuration, the sub-unit can be accommodated in a region formed inside the spiral-shaped circular coil.

The main unit of the coil device according to one aspect may include a first magnetic member disposed between the main base and the coil. The first magnetic member may form a first magnetic path portion related to the coil between the coil and the main base. The sub-housing may include a sub-base configured to be attached to the main base, and a sub-cover forming a region for accommodating the electrical function unit, together with the sub-base. The sub-unit may include a second magnetic member disposed between the electrical function unit and the sub-cover. The second magnetic member may form a second magnetic path portion between the electrical function unit and the sub-cover, the second magnetic path portion being magnetically connected to the first magnetic path portion. According to this configuration, a magnetic path passing through the first magnetic member and the second magnetic member is formed. An electromagnetic field emitted by the coil passes through the magnetic path. As a result, the leakage of the electromagnetic field, which is emitted by the coil, between the first magnetic member and the main base can be suppressed. Further, the leakage of the electromagnetic field, which is emitted by the coil, between the second magnetic member and the sub-base can be suppressed.

In a state where the sub-unit of the coil device according to one aspect is attached to the main unit, when viewed in a direction orthogonal to a normal direction of the main cover, the electrical function unit may be disposed between the first magnetic member and the main base. According to this disposition, an electromagnetic field emitted by the coil can be prevented from reaching the electrical function unit.

In a state where the sub-unit of the coil device according to one aspect is attached to the main unit, when viewed in a direction orthogonal to a normal direction of the main cover, the coil may be disposed between the second magnetic member and the sub-cover. According to this disposition, an electromagnetic field emitted by the coil can be prevented from reaching the electrical function unit.

The first magnetic member of the coil device according to one aspect may include a flat plate portion facing the coil, and a connecting portion extending from an end portion of the flat plate portion, the end portion facing the second magnetic member. The connecting portion may include a portion disposed between the second magnetic member and the sub-base. According to this disposition, an electromagnetic field emitted by the coil can be prevented from reaching the electrical function unit from a gap between the first magnetic member and the second magnetic member.

Hereinafter, one embodiment will be described in detail with reference to the drawings. It should be noted that in the description of the drawings, the same reference signs are assigned to the same elements or corresponding elements and duplicate descriptions may be omitted.

First, a wireless power supply system 1 according to the present embodiment will be described with reference to FIG. 1.

As illustrated in FIG. 1, a coil device 10 is used in the wireless power supply system 1. The wireless power supply system 1 wirelessly charges a battery mounted in a movable object V. As one example, the movable object V is a vehicle such as a passenger vehicle. The wireless power supply system 1 includes a power receiver 12 and a power transmitter 11. The coil device 10 is used for at least one of the power receiver 12 and the power transmitter 11. It should be noted that the coil device 10 may be used for both the power receiver 12 and the power transmitter 11. In the present embodiment, the coil device 10 is used for the power transmitter 11.

The coil device 10 used as the power transmitter 11 is fixed to, for example, an outdoor road surface G (installation target). The coil device 10 may be placed on the road surface G instead of being fixed to the road surface G. A high-frequency power source (not illustrated) is connected to a power transmission coil C1 of the coil device 10. It should be noted that when the coil device 10 is used as the power receiver 12, the coil device 10 is fixed to, for example, a chassis, etc. of the movable object V. In this case, a power receiving coil C2 of the power receiver 12 is connected to the battery mounted in the movable object V, via a power receiving circuit, a charging circuit, etc.

The power transmitter 11 faces the power receiver 12 in a height direction of the movable object V. The power transmission coil C1 is electromagnetically coupled with the power receiving coil C2. Wireless power transmission from the power transmission coil C1 to the power receiving coil C2 is performed by the electromagnetic coupling between the power transmission coil C1 and the power receiving coil C2. A so-called electromagnetic coupling circuit is formed by the electromagnetic coupling of the power transmission coil C1 with the power receiving coil C2. The electromagnetic coupling circuit may be a circuit that performs power transmission and power reception through "electromagnetic induction". The electromagnetic coupling circuit may be a circuit that performs power transmission and power reception through "magnetic resonance".

Hereinafter, the coil device 10 will be described in detail. In the following description, a direction in which the power transmitter 11 faces the power receiver 12 is referred to as a Z direction, one direction of in-plane directions orthogonal to the Z direction is referred to as an X direction, and a direction orthogonal to the X direction among the in-plane directions orthogonal to the Z direction is referred to as a Y direction. The X direction coincides with a left-right direction in FIG. 1. The Y direction coincides with a direction perpendicular to the drawing sheet of FIG. 1. The Z direction coincides with an up-down direction in FIG. 1.

Figure 2:
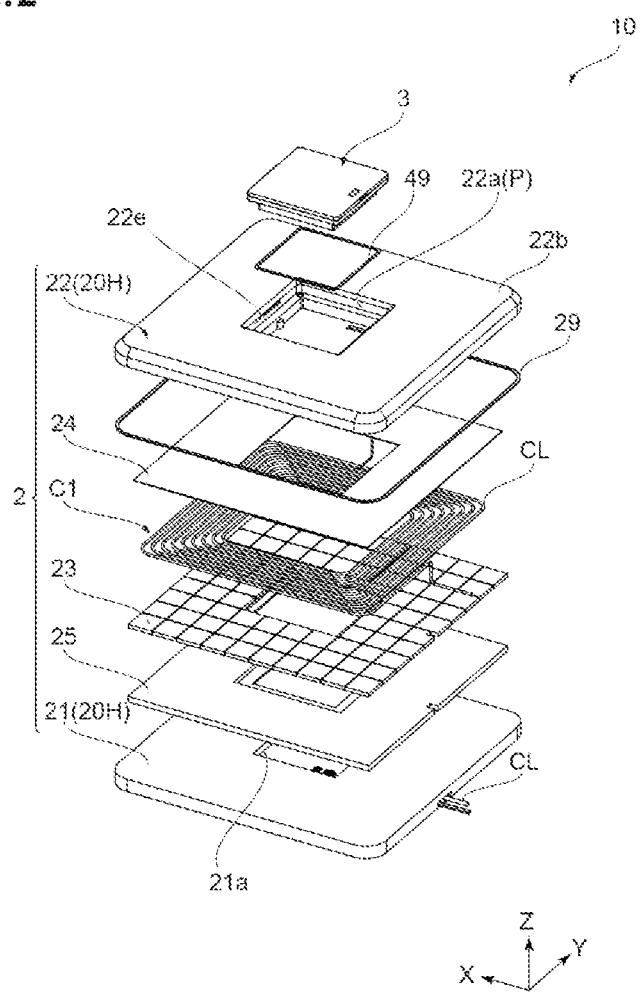
FIG. 2 is an exploded perspective view of the coil device according to one embodiment.

As illustrated in FIG. 2, the coil device 10 includes a main unit 2 and a sub-unit 3. As one example, the main unit 2 has a flat box shape. The main unit 2 includes a main base 21, a main cover 22, the power transmission coil C1, a main ferrite 23 (first magnetic member), a main sensor 24, and a main reinforcing plate 25. The main unit 2 accommodates the power transmission coil C1 described above. The main unit 2 has an accommodation portion P in which the sub-unit 3 is accommodated. In the present embodiment, the accommodation portion P is a depression formed at substantially the center of the main unit 2 when viewed in the Z direction.

The main base 21 is a substantially rectangular and flat plate-shaped member. As one example, the main base 21 is installed on the road surface G (refer to FIG. 1). The main base 21 may be fixed to the road surface G. The main base 21 may be simply placed on the road surface G instead of being fixed to the road surface G. The main base 21 is made of various materials such as a resin material and a metal material. In addition, the entirety or a part of the main base 21 may be made of a metal material with a low permeability, such as aluminum or copper. The leakage of electromagnetic waves to the outside of the main unit 2 can be suppressed by adopting the metal material with a low permeability. A depression 21a is formed at substantially the center of the main base 21.

The main cover 22 covers an upper portion of the main base 21. The main base 21 and the main cover 22 constitute a main housing 20H. The main cover 22 is configured to be attached to the main base 21. Namely, the main cover 22 covers the power transmission coil C1, the main ferrite 23, the main sensor 24, and the main reinforcing plate 25. A depression 22a is formed at substantially the center of the main cover 22. The depression 22a constitutes the accommodation portion P of the main unit 2. When the power transmission coil C1 is electromagnetically coupled with the power receiving coil C2, the main cover 22 is transparent to a magnetic field, and electromagnetic coupling is performed. For this reason, the main cover 22 is made of a material that does not affect electromagnetic coupling. A non-magnetic and electrically non-conductive material may be adopted as the material that does not affect electromagnetic coupling. As one example, the non-magnetic and electrically non-conductive material is a resin material such as fiber reinforced plastics (FRP).

As one example, the power transmission coil C1 is constituted of a conductive wire CL that is spirally wound in the same plane. The power transmission coil C1 is a so-called circular coil. The power transmission coil C1 surrounds the accommodation portion P in a plane perpendicular to the Z direction. It should be noted that the power transmission coil C1 is not limited to a circular type. For example, the power transmission coil C1 may be a solenoid type.

The main ferrite 23 is disposed on the power transmission coil C1. The main ferrite 23 is disposed opposite the main cover 22. In other words, the main ferrite 23 is disposed below the power transmission coil C1 and between the main base 21 and the power transmission coil C1. As one example, the main ferrite 23 is a plate-shaped member made of a magnetic material.

The main sensor 24 is disposed above the power transmission coil C1 and between the main cover 22 and the power transmission coil C1. The main sensor 24 detects a metal foreign object placed on the main cover 22. In addition, for example, when a tire of the movable object V rides over the main cover 22, the main sensor 24 may perform load detection.

The main reinforcing plate 25 is disposed above the main base 21. The main reinforcing plate 25 is a rectangular and annular member. The main reinforcing plate 25 is disposed between the main base 21 and the main ferrite 23. The main reinforcing plate 25 is made of a material with a low permeability. As one example, the material with a low permeability is an aluminum alloy, etc.

Figure 3:
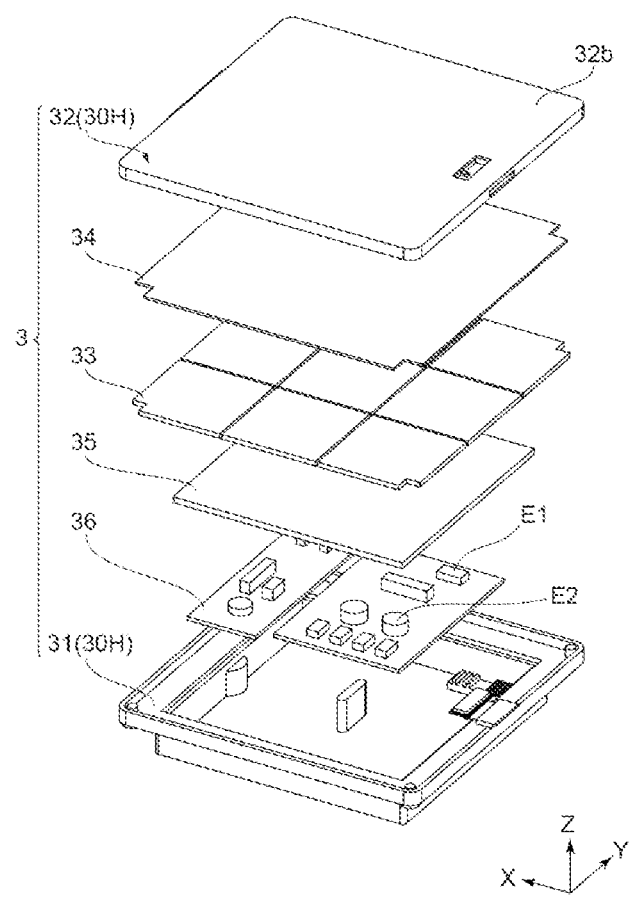
FIG. 3 is an exploded perspective view of a sub-unit according to one embodiment.

The sub-unit 3 is accommodated in the accommodation portion P of the main unit 2. The sub-unit 3 can be attached and detached from above the main unit 2. As illustrated in FIG. 3, the sub-unit 3 includes a sub-base 31, a sub-cover 32, a sub-ferrite 33 (second magnetic member), a sub-sensor 34, a sub-reinforcing plate 35, and a control substrate 36 (electrical function unit).

The sub-base 31 is a box-shaped member with an upper portion open. The sub-base 31 accommodates the control substrate 36, the sub-ferrite 33, the sub-sensor 34, and the sub-reinforcing plate 35.

The sub-cover 32 is a rectangular member. The sub-cover 32 is attached to the sub-base 31. The sub-base 31 and the sub-cover 32 constitute a sub-housing 30H. The sub-cover 32 covers an opening of the upper portion of the sub-base 31. Namely, the sub-cover 32 covers the control substrate 36 accommodated in the sub-base 31, etc.

The sub-ferrite 33 is disposed between the control substrate 36 and the sub-cover 32. In other words, the control substrate 36 is disposed between the sub-base 31 and the sub-ferrite 33. The sub-ferrite 33 is a rectangular member. The sub-ferrite 33 may be made of, for example, the same material as that of the main ferrite 23. The sub-ferrite 33 cooperates with the main ferrite 23. In cooperation with the main ferrite 23, the sub-ferrite 33 forms a magnetic path for an electromagnetic field generated by the power transmission coil C1.

The sub-sensor 34 is disposed between the sub-cover 32 and the sub-ferrite 33. The sub-sensor 34 includes a sensor for detecting a metal foreign object placed on the sub-cover 32. The sub-reinforcing plate 35 is disposed between the control substrate 36 and the sub-ferrite 33. The sub-reinforcing plate 35 is a rectangular member.

The control substrate 36 provides various electrical functions to the main unit 2. Namely, the control substrate 36 performs predetermined processing. As one example, the control substrate 36 controls electric power supplied to the power transmission coil C1. The high-frequency power source supplies AC power to the power transmission coil C1 via the control substrate 36. The control substrate 36 converts the AC power supplied from the high-frequency power source, into AC power of an optimum frequency for power transmission and reception. The control substrate 36 may convert AC power into DC power as needed. The control substrate 36 may convert DC power into AC power again. The control substrate 36 may perform voltage conversion or electric current conversion. The control substrate 36 may include the function of a high-frequency power source. In this case, a housing device such as a high-frequency power source does not exist between a commercial power source and the coil device 10 including the control substrate 36. Therefore, the commercial power source can be directly connected to the control substrate 36. In addition, the control substrate 36 may perform control processing for foreign object detection by the main sensor 24 and the sub-sensor 34.

The control substrate 36 includes an electric substrate provided with a pattern wiring, and a plurality of electric components E1 and electronic components E2 attached to the electric substrate. It should be noted that the components constituting the control substrate 36 may be only the electric components E1 for electric power conversion. The components constituting the control substrate 36 may be only the electronic components E2 for a control function.

Figure 4:
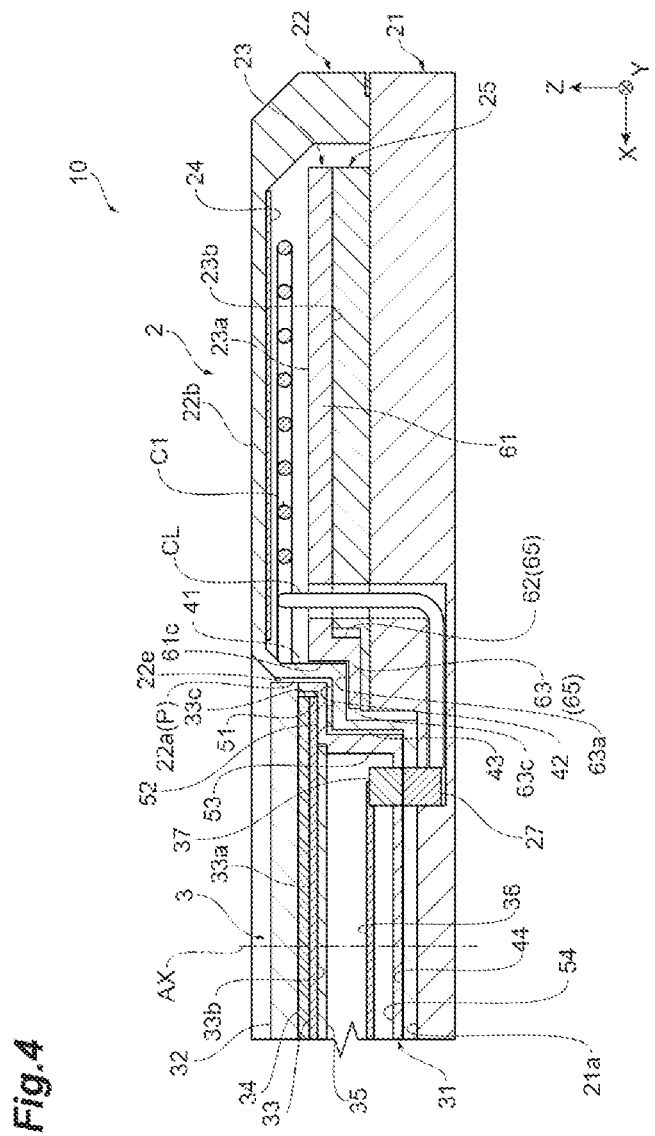
FIG. 4 is a cross-sectional view of the coil device according to one embodiment.

As illustrated in FIG. 4, the coil device 10 is symmetrically configured with respect to an axis AX. In the example illustrated in FIG. 4, only one side of the axis AX is illustrated. In the present embodiment, the main base 21, the main reinforcing plate 25, the main ferrite 23, the power transmission coil C1, the main sensor 24, and the main cover 22 are stacked in order in the Z direction.

The depression 22a of the main cover 22 is configured as the accommodation portion P. The main cover 22 includes a first wall portion 41, a contact portion 42, a second wall portion 43, and a bottom portion 44 in the depression 22a. The first wall portion 41 extends from an inner end portion of a main cover upper surface 22b toward a main base 21 side (lower side). The contact portion 42 extends from a main base 21-side end portion of the first wall portion 41 toward the inside of the main base 21. The second wall portion 43 extends from a tip portion of the contact portion 42 toward the main base 21 side. The bottom portion 44 connects the tip portions of the second wall portion 43. The bottom portion 44 of the main cover 22 is fitted into the depression 21a of the main base 21.

Inside the power transmission coil C1, the conductive wire CL constituting the power transmission coil C1 extends toward the main base 21 side. The conductive wire CL extends in the Z direction, and penetrates through the main ferrite 23 and the main reinforcing plate 25. The conductive wire CL is inserted into the inside of the main base 21. The conductive wire CL is bent toward the inside of the main base 21 when viewed in the Z direction. The conductive wire CL is connected to a main waterproof connector 27.

The main ferrite 23 includes a flat plate portion 61, a first portion 62, and a second portion 63. The first portion 62 and the second portion 63 constitute a connecting portion 65. The flat plate portion 61 is disposed on the main reinforcing plate 25. In addition, the flat plate portion 61 faces the power transmission coil C1. The first portion 62 protrudes from an inner end portion 61c of the flat plate portion 61 toward a main reinforcing plate 25 side. The second portion 63 protrudes inward from a tip of the first portion 62. The flat plate portion 61, the first portion 62, and the second portion 63 are integrally formed. It should be noted that the flat plate portion 61, the first portion 62, and the second portion 63 may be separately formed. The first portion 62 extends along the first wall portion 41, and the second portion 63 extends along the contact portion 42.

The sub-base 31, the control substrate 36, the sub-reinforcing plate 35, the sub-ferrite 33, the sub-sensor 34, and the sub-cover 32 are stacked in order in the Z direction. The sub-base 31 includes a first wall portion 51, a contact portion 52, a second wall portion 53, and a bottom portion 54. The first wall portion 51 forms an opening of the sub-base 31. The first wall portion 51 extends toward the main base 21 side. The contact portion 52 extends from a main base 21-side end portion of the first wall portion 51 toward the inside of the sub-base 31. The second wall portion 53 extends from a tip portion of the contact portion 52 toward the main base 21 side. The bottom portion 54 connects the tip portions of the second wall portion 53. The bottom portion 54 of the sub-base 31 is in contact with the bottom portion 44 of the main cover 22.

The control substrate 36 is accommodated within the sub-base 31. A sub-waterproof connector 37 is connected to the control substrate 36. The sub-waterproof connector 37 is detachably connected to the main waterproof connector 27. Accordingly, the control substrate 36 of the sub-unit 3 is connected to the power transmission coil C1 of the main unit 2. In more detail, the high-frequency power source supplies AC power to the power transmission coil C1 via the main waterproof connector 27 and the sub-waterproof connector 37.

As described above, in the coil device 10, the sub-unit 3 is accommodated in the accommodation portion P of the main unit 2. More specifically, in a state where the sub-unit 3 is accommodated in the main unit 2, the first wall portion 41 of the main cover 22 extends along the first wall portion 51 of the sub-base 31. The contact portion 42 of the main cover 22 extends along the contact portion 52 of the sub-base 31. The second wall portion 43 of the main cover 22 extends along the second wall portion 53 of the sub-base 31. The bottom portion 44 of the main cover 22 extends along the bottom portion 54 of the sub-base 31.

The first wall portion 41 is separated from the first wall portion 51. The contact portion 42 is separated from the contact portion 52. The second wall portion 43 is separated from the second wall portion 53. However, the first wall portion 41 may be in contact with the first wall portion 51. The contact portion 42 may be in contact with the contact portion 52. The second wall portion 43 may be in contact with the second wall portion 53.

Figure 5A:
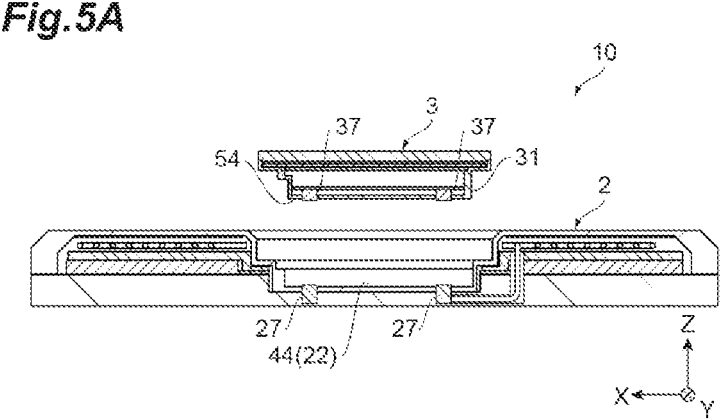
FIG. 5A is a cross-sectional view of the coil device in a state where the sub-unit is removed from a main unit.
Figure 5B:
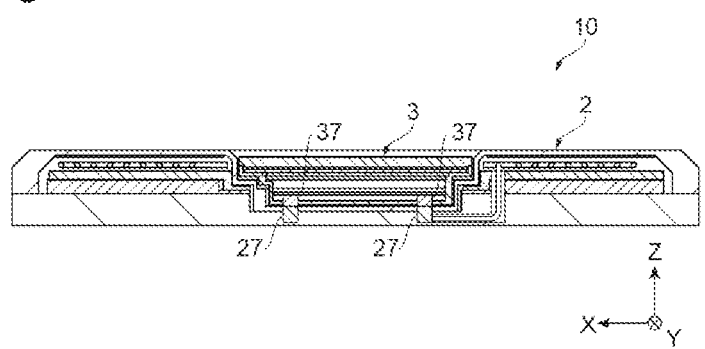
FIG. 5B is a cross-sectional view of the coil device in a state where the sub-unit is mounted on a main unit.

As illustrated in FI. 5(a), the main waterproof connector 27 is exposed from the bottom portion 44 of the main cover 22. In addition, the sub-waterproof connector 37 is exposed from the bottom portion 54 of the sub-base 31. As illustrated in FIG. 5(b), when the sub-unit 3 is accommodated in the main unit 2, the main waterproof connector 27 on a main unit 2 side is electrically connected to the sub-waterproof connector 37 on a sub-unit 3 side.

There is a possibility that a part of an electromagnetic field generated by the power transmission coil C1 enters a road surface G side from a portion at which the main ferrite 23 is separated from the sub-ferrite 33. In this case, the magnitude of the electromagnetic field from the power transmitter 11 toward the power receiver 12 is reduced. As a result, there is a possibility that the efficiency of power transmission from the power transmission coil C1 to the power receiving coil C2 decreases.

Figure 6:
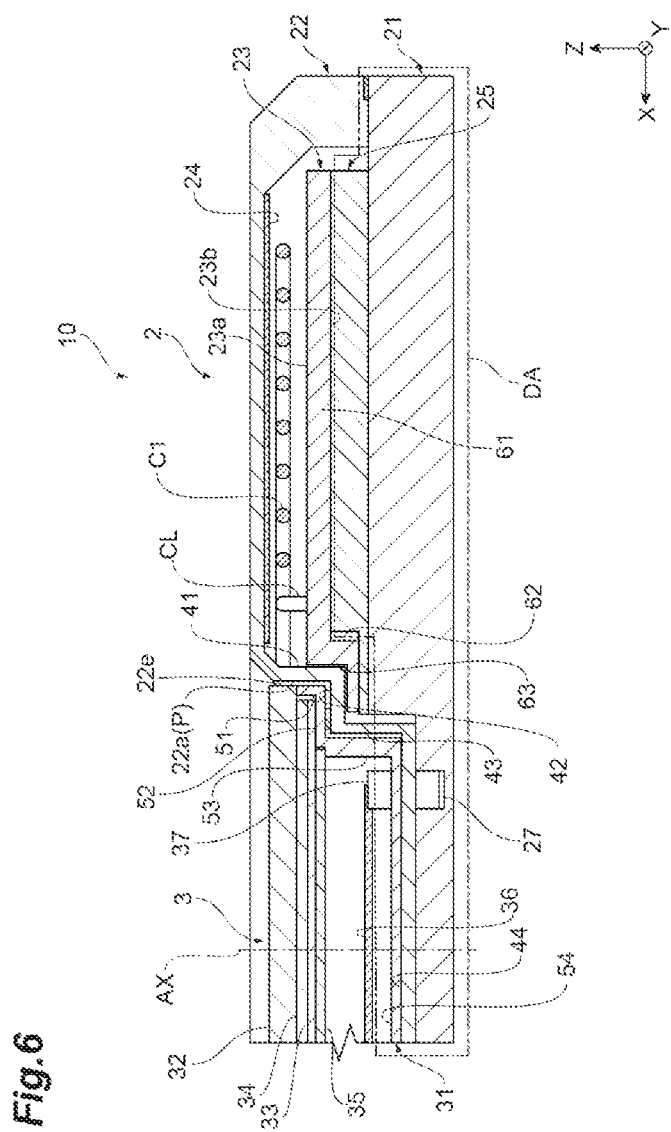
FIG. 6 is a cross-sectional view illustrating a magnetic field prohibited region in the coil device according to one embodiment.

Therefore, it is desirable that the coil device 10 is configured such that the electromagnetic field does not leak toward the road surface G side. More specifically, as illustrated in FIG. 6, the coil device 10 has a configuration that does not generate an electromagnetic field in a magnetic field prohibited region DA. The magnetic field prohibited region DA refers to a region on the road surface G side in the Z direction with respect to the main reinforcing plate 25 of the main unit 2 and the control substrate 36 of the sub-unit 3.

Figure 7:
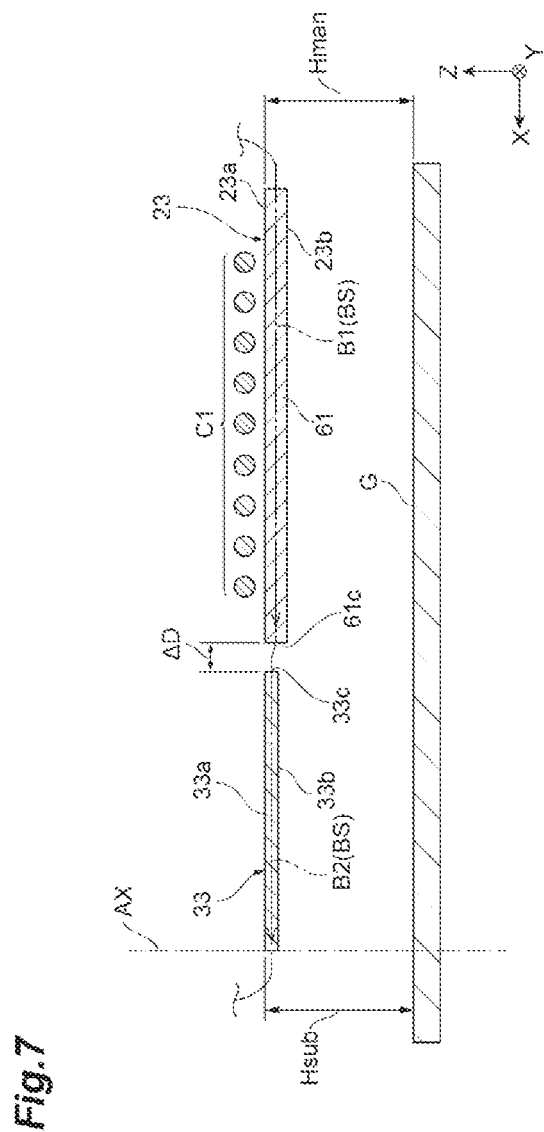
FIG. 7 is a schematic cross-sectional view illustrating a main ferrite and a sub-ferrite according to one embodiment.

Subsequently, the main ferrite 23 and the sub-ferrite 33 will be described in detail with reference to FIGS. 7 and 8. FIG. 7 illustrates only the main ferrite 23, the sub-ferrite 33, and the power transmission coil C1. In FIG. 7, the illustration of other components constituting the coil device 10 is omitted. In addition, FIG. 7 illustrates only the flat plate portion 61 of the main ferrite 23. In FIG. 7, the illustration of the first portion 62 and the second portion 63 of the main ferrite 23 is omitted. The main ferrite 23 forms a magnetic path B1 (first magnetic path portion) between the power transmission coil C1 and the main base 21. The main ferrite 23 has a main ferrite principal surface 23a facing a power transmission coil C1 side, and a main ferrite back surface 23b opposite the main ferrite principal surface 23a. The sub-ferrite 33 forms a magnetic path B2 (second magnetic path portion) between the control substrate 36 and the sub-cover 32. The sub-ferrite 33 has a sub-ferrite principal surface 33a facing the power transmission coil C1 side in the Z direction, and a sub-ferrite back surface 33b opposite the sub-ferrite principal surface 33a.

It is desirable that the main ferrite 23 and the sub-ferrite 33 do not form a physical gap from the viewpoint of a magnetic circuit. It is desirable that the main ferrite 23 is in contact with the sub-ferrite 33. Therefore, the main ferrite 23 may be in contact with the sub-ferrite 33.

However, it is acceptable if the main ferrite 23 is magnetically connected to the sub-ferrite 33. Being magnetically connected may be defined as that the magnetic path B1 of the main ferrite 23 and the magnetic path B2 of the sub-ferrite 33 form one magnetic circuit BS. Namely, the main ferrite 23 may not necessarily be in direct contact with the sub-ferrite 33. For example, a gap where air exists, the main housing 20H, the sub-housing 30H, etc. exist between the main ferrite 23 and the sub-ferrite 33. Even when there are these elements between the main ferrite 23 and the sub-ferrite 33, the main ferrite 23 can be magnetically connected to the sub-ferrite 33 depending on a distance from the main ferrite 23 to the sub-ferrite 33. Therefore, the distance from the main ferrite 23 to the sub-ferrite 33 is important. Hereinafter, the distance from the main ferrite 23 to the sub-ferrite 33 will be described.

A distance Hman [mm] from the main ferrite principal surface 23a to the road surface G is equal to or greater than a distance Hsub [mm] from the sub-ferrite principal surface 33a to the road surface G. According to this configuration, a height in the Z direction of the sub-unit 3 can be set to be smaller than a height in the Z direction of the main unit 2. By setting the height in the Z direction of the sub-unit 3 to be smaller than the height in the Z direction of the main unit 2, it is possible to configure the coil device 10 that is less likely to obstruct the passage of pedestrians, passenger vehicles, etc. A distance ΔD [mm] from the inner end portion 61c of the flat plate portion 61 of the main ferrite 23 to an inner end portion 33c of the sub-ferrite 33 is 5 mm or less. In short, the coil device 10 satisfies a relational equation of Hman≥Hsub and ΔD≥5. As one example, FIG. 7 illustrates a configuration in which the main ferrite principal surface 23a is flush with the sub-ferrite principal surface 33a. Namely, Hman=Hsub.

It should be noted that in the above description, the distance Hman and the distance Hsub are measured with the road surface G as a reference point. For example, the factor defining the distance Hman and the distance Hsub is not limited to the road surface G. For example, instead of the road surface G, a main base back surface 21b of the main base 21 may be adopted. In this case, the distance Hman may be defined as a distance from the main ferrite principal surface 23a to the main base back surface 21b. The distance Hsub may be defined as a distance from the sub-ferrite principal surface 33a to the main base back surface 21b.

Figure 8:
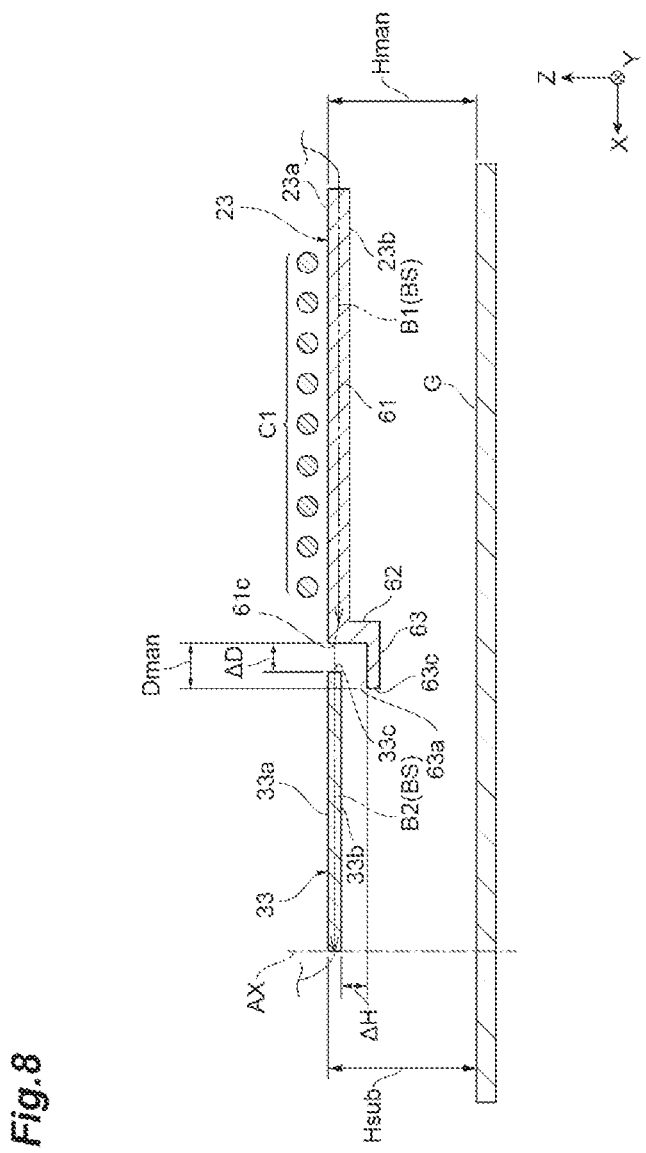
FIG. 8 is a schematic cross-sectional view illustrating the main ferrite and the sub-ferrite according to one embodiment.

FIG. 8 illustrates only the main ferrite 23, the sub-ferrite 33, and the power transmission coil C1. In FIG. 8, the illustration of other components constituting the coil device 10 is omitted. The second portion 63 of the main ferrite 23 has a surface 63a facing the power transmission coil C1 side in the Z direction.

In regard to the definition of a distance ΔH [mm], the distance ΔH [mm] is a distance from the surface 63a of the second portion 63 of the main ferrite 23 to the sub-ferrite back surface 33b of the sub-ferrite 33. The distance ΔH [mm] 5 mm or less. In addition, in regard to the definition of a distance Dman, the distance Dman is a distance from the inner end portion 61c of the flat plate portion 61 of the main ferrite 23 to a tip portion 63c of the second portion 63. The distance Dman is greater than the distance ΔH [mm]. The coil device 10 satisfies a relational equation of 0 [mm] ≤ΔH≤5 [mm] and 0 [mm]≤ΔD<Dman. Then, the surface 63a of the tip portion of the second portion 63 faces the sub-ferrite back surface 33b. Namely, the second portion 63 includes a region facing the sub-ferrite back surface 33b, and a region not facing the sub-ferrite back surface 33b.

As in the embodiment, by disposing the main ferrite 23 and the sub-ferrite 33, it is possible to realize a configuration in which the magnetic path B1 of the main ferrite 23 and the magnetic path B2 of the sub-ferrite 33 are magnetically connected.

Subsequently, regarding the coil device 10 according to the present embodiment, a configuration for aligning the sub-unit 3 with respect to the main unit 2 will be described with reference to FIGS. 9 and 10.

Figure 9:
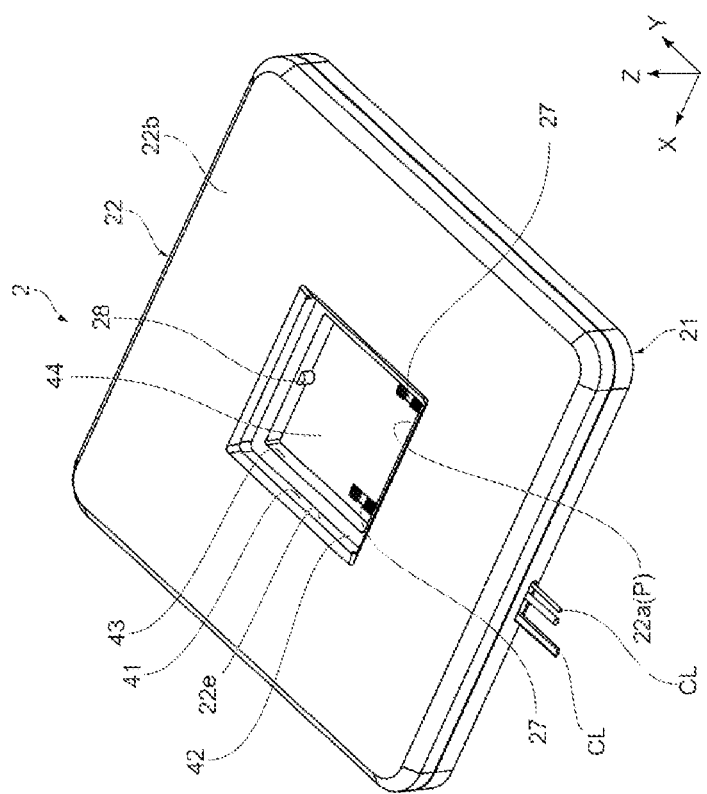
FIG. 9 is a perspective view of the main unit according to one embodiment.

As illustrated in FIG. 9, the main waterproof connector 27 is disposed on one side in the Y direction inside the accommodation portion P of the main unit 2. The main waterproof connector 27 is exposed from the bottom portion 44 of the main cover 22. In addition, an alignment portion 28 is provided on the other side in the Y direction inside the accommodation portion P of the main unit 2. The alignment portion 28 is a projection having a substantially columnar shape and divided into two parts. The alignment portion 28 is in contact with the bottom portion 44 of the main cover 22.

Figure 10:
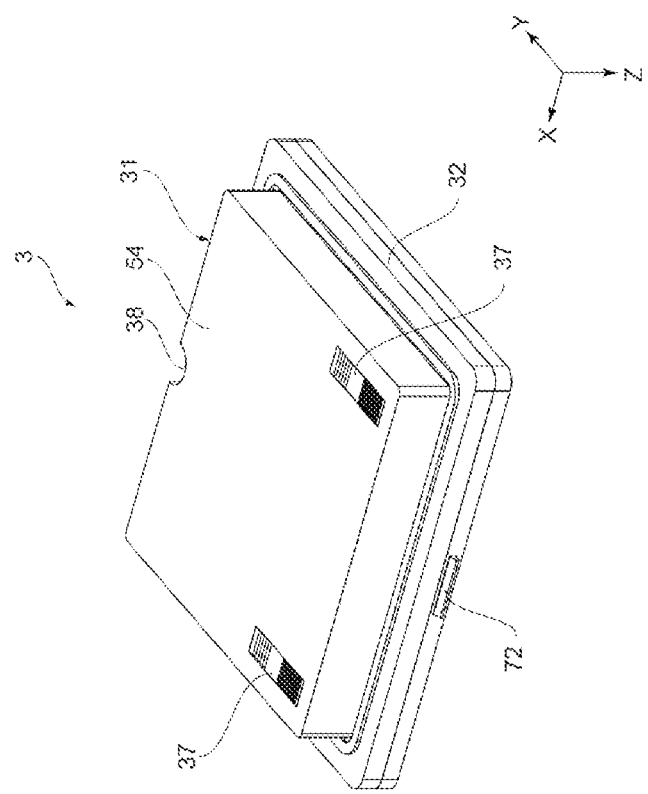
FIG. 10 is a perspective view of the sub-unit according to one embodiment.

As illustrated in FIG. 10, the sub-waterproof connector 37 is disposed on the one side in the Y direction on the bottom portion 54 of the sub-base 31. The sub-waterproof connector 37 is exposed from the bottom portion 54 of the sub-base 31. In addition, an alignment groove 38 is provided on the other side in the Y direction in the bottom portion 54 of the sub-base 31. The shape of the alignment groove 38 corresponds to the shape of the alignment portion 28. The alignment portion 28 of the main unit 2 can be fitted into the alignment groove 38 of the sub-unit 3.

Subsequently, a waterproof configuration provided in the coil device 10 will be described with reference to FIGS. 11, 12, and 13.

Figure 11:
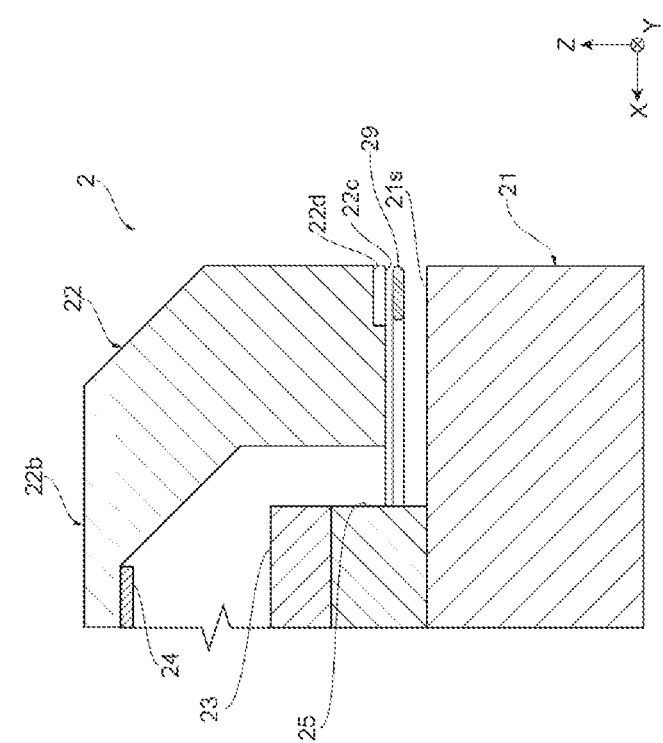
FIG. 11 is an enlarged cross-sectional view illustrating a waterproof structure of the coil device illustrated in FIG. 2.

As illustrated in FIG. 11, the main unit 2 includes a main waterproof packing 29. The external shape of the main waterproof packing 29 corresponds to the external shape of the main base 21. The main waterproof packing 29 is disposed on a peripheral edge portion of the main base 21. The main waterproof packing 29 is sandwiched between the main base 21 and the main cover 22. In more detail, the main waterproof packing 29 is sandwiched between a main principal surface 21s of the main base 21 and a packing groove 22d provided in a cover back surface 22c of the main cover 22. The shape of the main waterproof packing 29 is a rectangular and annular shape (refer to FIG. 2). The main cover 22 is watertightly attached to the main base 21 by disposing the main waterproof packing 29. Further, according to the main waterproof packing 29, a very small foreign object such as dust or sand can be prevented from entering the inside of the main housing 20H. Namely, the main waterproof packing 29 exhibits waterproofness and dustproofness.

It should be noted that the main waterproof packing 29 is an independent one component. For example, the main waterproof packing 29 can also be replaced with a resin adhesive agent as a configuration that exhibits waterproofness and dustproofness. Particularly, the coil device 10 does not require opening at least the main housing 20H for maintenance of the control substrate 36. Opening the main housing 20H refers to removing the main cover 22 from the main base 21. From the viewpoint of performing a removal, the configuration for waterproofness and dustproofness is not limited to the main waterproof packing 29. However, since the need for removal is low, it is possible to adopt a configuration in which the main base 21 and the main cover 22 are joined with an adhesive agent.

Figure 12:
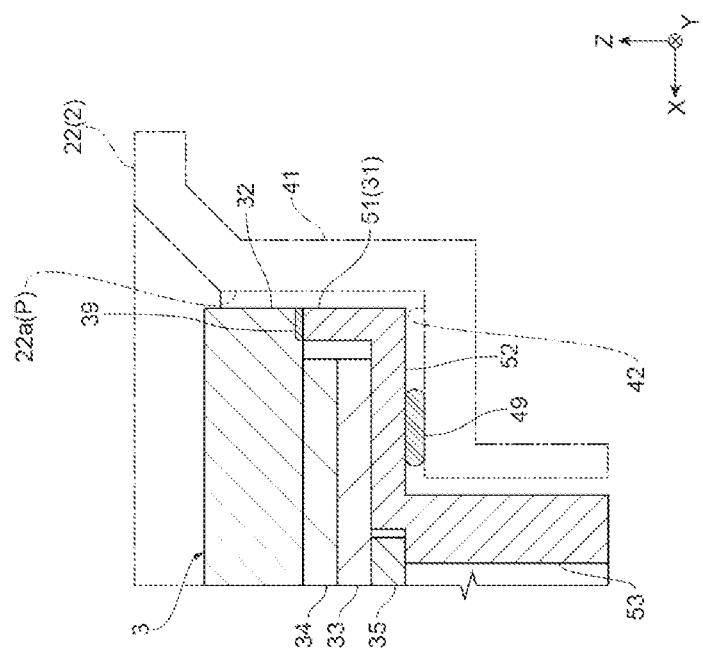
FIG. 12 is an enlarged cross-sectional view illustrating another waterproof structure of the coil device illustrated in FIG. 2.

As illustrated in FIG. 12, the sub-unit 3 includes a sub-waterproof packing 39. The external shape of the sub-waterproof packing 39 corresponds to the external shape of the sub-base 31. The sub-waterproof packing 39 is disposed between the first wall portion 51 of the sub-base 31 and the sub-cover 32. The shape of the sub-waterproof packing 39 is a rectangular and annular shape. The sub-cover 32 is watertightly attached to the sub-base 31 by disposing the sub-waterproof packing 39. Similarly to the main waterproof packing 29, the sub-waterproof packing 39 also exhibits waterproofness and dustproofness.

A waterproof packing 49 is disposed between the contact portion 42 of the main cover 22 and the contact portion 52 of the sub-base 31 (refer to FIG. 2). The sub-base 31 is watertightly mounted on the main cover 22 by disposing the waterproof packing 49. The entry of water between the main cover 22 and the sub-base 31 can be suppressed by watertightly mounting the sub-base 31 on the main cover 22.

Figure 13:
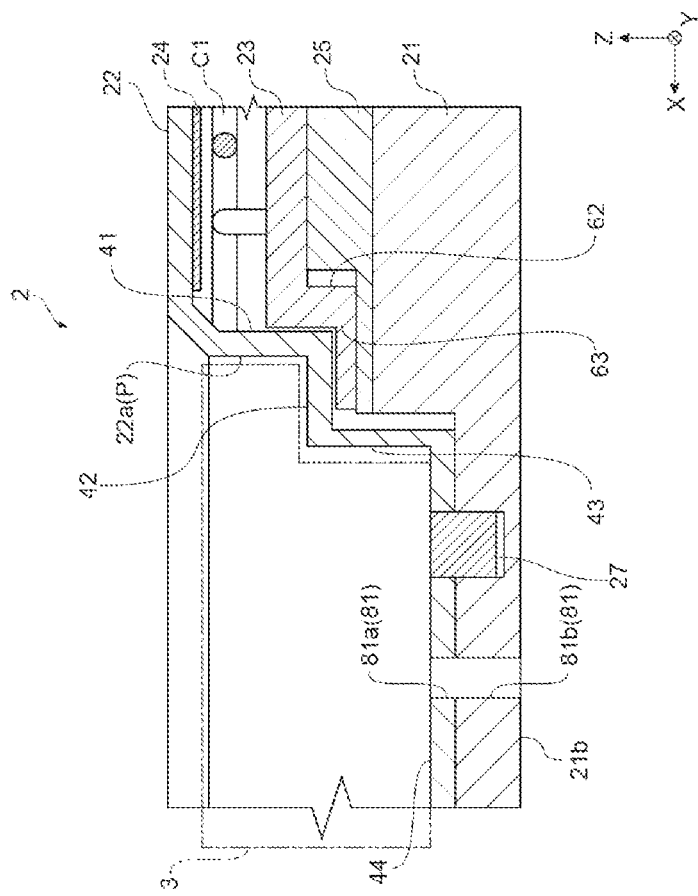
FIG. 13 is a cross-sectional view illustrating a water drainage structure of the coil device illustrated in FIG. 2.

As illustrated in FIG. 13, a water drain hole 81 is formed in the main unit 2. The water drain hole 81 is a through-hole. The water drain hole 81 discharges liquid that has entered the accommodation portion P. More specifically, the water drain hole 81 extends in the Z direction from the bottom portion 44 of the main cover 22 toward the main base back surface 21b. In other words, the water drain hole 81 penetrates through the bottom portion 44 of the main cover 22 and the main base 21. Namely, the water drain hole 81 is constituted of a hole 81a provided in the main base 21, and a hole 81b provided in the main cover 22. Accordingly, for example, when liquid such as rainwater has entered the accommodation portion P, the liquid is discharged to the outside of the coil device 10 by passing through the water drain hole 81. The bottom portion 44 of the main cover 22 may be inclined toward the water drain hole 81. In this case, the liquid that has entered the accommodation portion P is guided to the water drain hole 81. Accordingly, better drainage conditions within the accommodation portion P can be maintained.

Subsequently, a configuration for detachably accommodating the sub-unit 3 in the main unit 2 will be described with reference to FIGS. 14, 15, 16, and 17.

Figure 14:
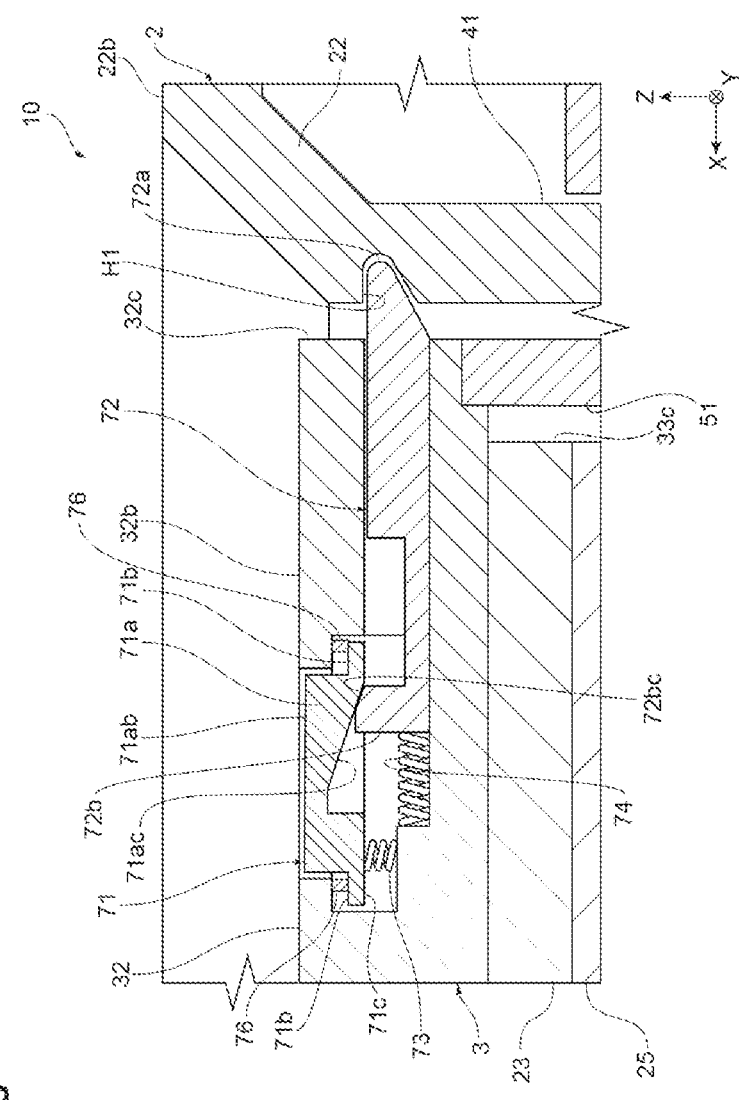
FIG. 14 is a cross-sectional view illustrating a state where the sub-unit is fixed to the main unit by an attachment and detachment mechanism of the coil device illustrated in FIG. 2.

As illustrated in FIG. 14, an attachment and detachment button 71 and a lock bar 72 are disposed inside the sub-cover 32. The attachment and detachment button 71 and the lock bar 72 are disposed on one end side in the X direction of the sub-cover 32.

The attachment and detachment button 71 includes a button body 71a and a button flange 71b. The button body 71a is exposed from a cover upper surface 32b of the sub-cover 32. The button flange 71b protrudes substantially perpendicularly from an end portion in the Z direction of the button body 71a. A bellows 76 having flexibility may be disposed between the button flange 71b and the sub-cover 32. A button upper surface 71ab may be flush with the cover upper surface 32b. A button inclined surface 71ac is formed on a button lower surface 71c opposite the button upper surface 71ab. Since the button inclined surface 71ac is formed, the thickness of the button body 71a increases toward a main cover 22 side. The thickness refers to a length in the Z direction. In addition, a spring 73 that is expandable and contractable in the Z direction is disposed between the button lower surface 71c and the sub-cover 32. The spring 73 is, for example, a compression spring.

The lock bar 72 extends along the X direction. The lock bar 72 is slidable from the sub-cover 32 toward the main cover 22. The lock bar 72 includes a bar tip 72a and a bar rear end 72b. The bar tip 72a faces the main cover 22 side. The bar rear end 72b is formed opposite the bar tip 72a. The bar tip 72a is exposed from a side surface 32c of the sub-cover 32. The bar tip 72a is inserted into an insertion hole H1 provided in the first wall portion 41 of the main cover 22. The bar rear end 72b is in contact with the button inclined surface 71ac. More specifically, a bar inclined surface 72bc formed in the same direction as the button inclined surface 71ac is formed at the bar rear end 72b. The bar inclined surface 72bc is in contact with the button inclined surface 71ac. A spring 74 that is expandable and contractable in the X direction is disposed on a bar rear end 72b side. The spring 74 is, for example, a compression spring. The bar tip 72a is inserted into the insertion hole H1 of the first wall portion 41 by an elastic force of the spring 74. Accordingly, the sub-unit 3 is fixed to the main unit 2.

Figure 15:
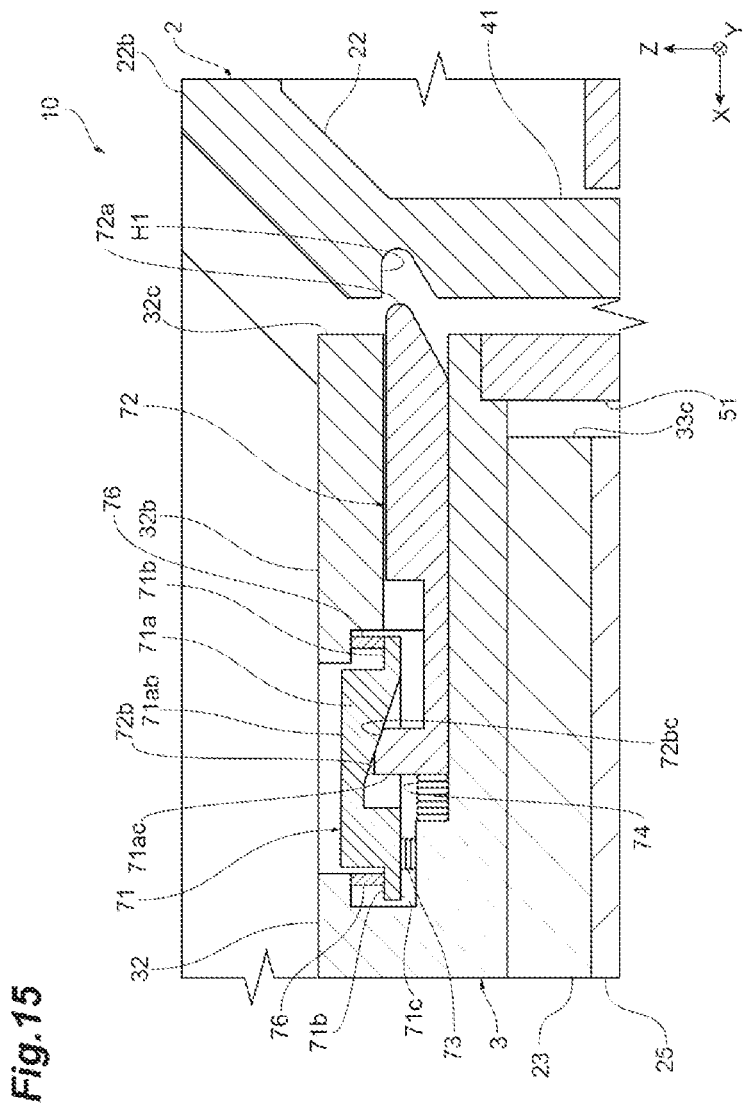
FIG. 15 is a cross-sectional view illustrating a state where the sub-unit is removed from the main unit by the attachment and detachment mechanism of the coil device illustrated in FIG. 2.

FIG. 15 illustrates a state where the attachment and detachment button 71 is pressed by an administrator, etc. of the coil device 10. The attachment and detachment button 71 is moved in the Z direction by being pressed against an elastic force of the spring 73. When the attachment and detachment button 71 is pressed, the lock bar 72 is moved in a direction away from the main cover 22 by a link mechanism. More specifically, the bar inclined surface 72bc is in contact with the button inclined surface 71ac. In this state, when the attachment and detachment button 71 is pressed, the bar rear end 72b slides along the button inclined surface 71ac in a direction away from the main cover 22. Accordingly, the bar tip 72a is pulled out from the insertion hole H1 of the first wall portion 41 of the main cover 22. As a result, the sub-unit 3 can be removed from the main unit 2.

Figure 16:
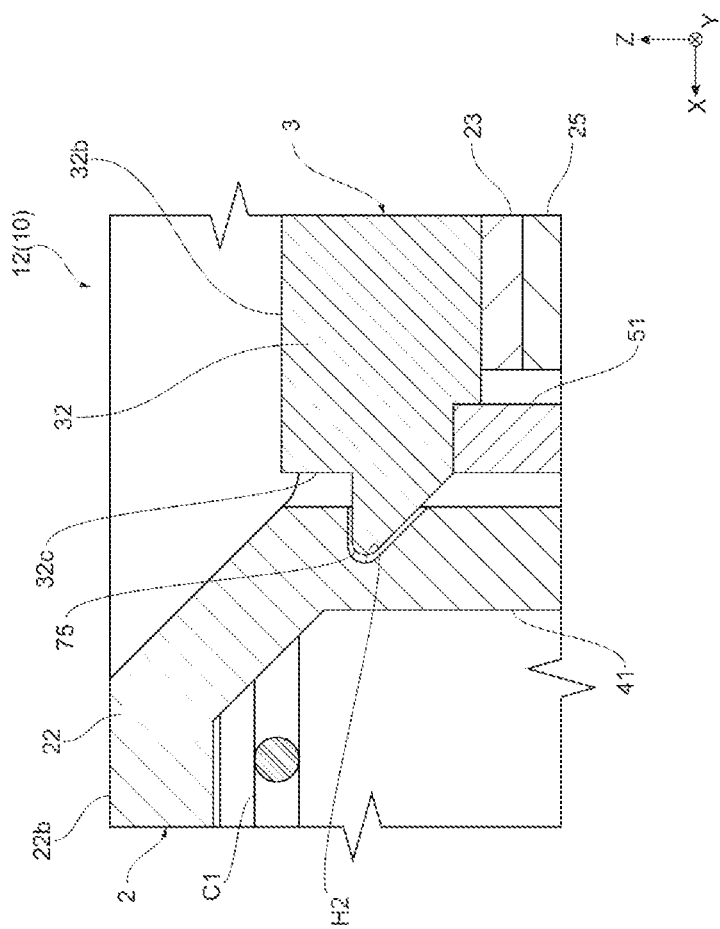
FIG. 16 is a cross-sectional view illustrating another portion of the attachment and detachment mechanism of the coil device illustrated in FIG. 2.

As illustrated in FIG. 16, a projection 75 is provided on the other end side in the X direction of the sub-cover 32. The projection 75 protrudes from the side surface 32c of the sub-cover 32 toward the main cover 22. The projection 75 is inserted into an insertion hole H2 provided in the first wall portion 41 of the main cover 22.

Figure 17A:
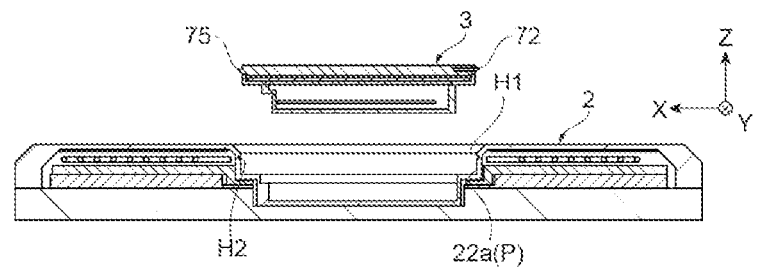
FIG. 17A is a cross-sectional view illustrating a state before the sub-unit is attached to the main unit.
Figure 17B:
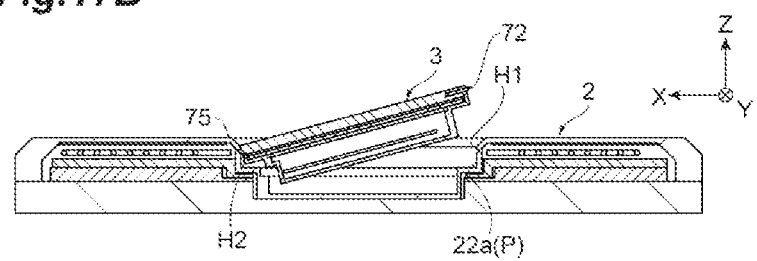
FIG. 17B is a cross-sectional view illustrating a state in the process of the sub-unit being attached to the main unit.
Figure 17C:
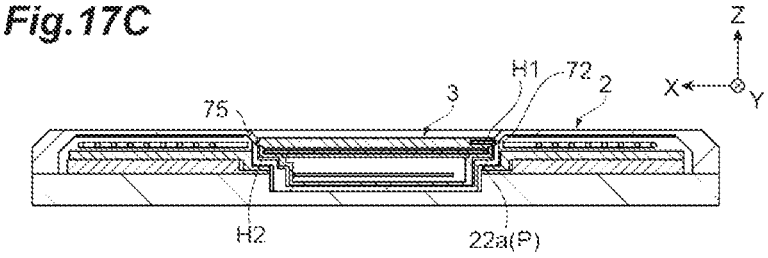
FIG. 17C is a cross-sectional view illustrating a state after the sub-unit is attached to the main unit.

As illustrated in FIG. 17(a), for example, when a user such as an administrator accommodates the sub-unit 3 in the main unit 2, the user disposes a lock bar 72 side of the sub-unit 3 on an insertion hole H1 side. Then, the user disposes a projection 75 side of the sub-unit 3 on an insertion hole H2 side. Subsequently, as illustrated in FIG. 17(b), the projection 75 is inserted into the insertion hole H2 while rotating the sub-unit 3 around an axis along the Y direction. Subsequently, as illustrated in FIG. 17(c), the lock bar 72 is inserted into the insertion hole H1. Accordingly, the sub-unit 3 is accommodated in the main unit 2. In addition, when a user such as an administrator, etc. of the coil device 10 removes the sub-unit 3 from the main unit 2, for example, the user presses the attachment and detachment button 71. As a result, the lock bar 72 is pulled out from the insertion hole H1. In this state, the user can remove the sub-unit 3 from the main unit 2 by following the procedure illustrated in FIGS. 17(a) to 17(c) in reverse order.

The coil device 10 described above includes the main unit 2 in which the power transmission coil C1 that wirelessly transmits electric power is accommodated in the main housing 20H fixed to the road surface G. The coil device 10 includes the sub-unit 3 in which the control substrate 36 that provides the main unit 2 with electrical functions performed by at least one of the electric components E1 and the electronic components E2 is accommodated in the sub-housing 30H detachably configured to be attached to the main housing 20H. The main unit 2 has the accommodation portion P that detachably accommodates the sub-unit 3.

In the coil device 10, the control substrate 36 including the plurality of electric components E1 and electronic components E2 is accommodated in the sub-housing 30H. Then, the sub-housing 30H is detachably accommodated in the main housing 20H that accommodates the power transmission coil C1. According to this configuration, the control substrate 36 can be removed by removing the sub-housing 30H from the main housing 20H. Namely, there is no need to open the main housing 20H accommodating the power transmission coil C1, in order to remove the control substrate 36. Therefore, the coil device 10 is easy to maintain.

Namely, when the control substrate 36 is repaired or replaced, there is no need to remove the main housing 20H from an installation place. Further, since there is no need to open the main housing 20H, there is no need to invert the main unit 2 either. In addition, when the repair of the control substrate 36 cannot be performed on site, only the sub-unit 3 needs to be transported to a service center, etc., and there is no need to transport the main unit 2 accommodating the power transmission coil C1.

The main housing 20H of the coil device 10 includes the main base 21 fixed to the road surface G, and the main cover 22 forming a region for accommodating the power transmission coil C1, together with the main base 21. The accommodation portion P is the depression 22a including an opening 22e formed in the main cover 22. According to this configuration, the sub-unit 3 can be accommodated in a region formed inside the spiral-shaped circular power transmission coil C1.

The main unit 2 of the coil device 10 is disposed between the main base 21 and the power transmission coil C1. The main unit 2 includes the main ferrite 23 forming the magnetic path B1 related to the power transmission coil C1 between the power transmission coil C1 and the main base 21. The sub-housing 30H includes the sub-base 31 configured to be attached to the main base 21, and the sub-cover 32 forming a region for accommodating the control substrate 36, together with the sub-base 31. The sub-unit 3 includes the sub-ferrite 33 disposed between the control substrate 36 and the sub-cover 32. According to this configuration, the magnetic paths B1 and B2 passing through the main ferrite 23 and the sub-ferrite 33 are formed. An electromagnetic field emitted by the power transmission coil C1 passes through the magnetic paths B1 and B2. As a result, the leakage of the electromagnetic field, which is emitted by the power transmission coil C1, between the main ferrite 23 and the main base 21 can be suppressed. Further, the leakage of the electromagnetic field, which is emitted by the power transmission coil C1, between the sub-ferrite 33 and the sub-base 31 can be suppressed.

In a state where the sub-unit 3 of the coil device 10 is attached to the main unit 2, when viewed in the Z direction orthogonal to a normal direction of the main cover 22, the control substrate 36 is disposed between the main ferrite 23 and the main base 21. According to this disposition, an electromagnetic field emitted by the power transmission coil C1 can be prevented from reaching the control substrate 36.

In the state where the sub-unit 3 of the coil device 10 is attached to the main unit 2, when viewed in the Z direction orthogonal to the normal direction of the main cover 22, the power transmission coil C1 is disposed between the sub-ferrite 33 and the sub-cover 32. According to this disposition, an electromagnetic field emitted by the power transmission coil C1 can be prevented from reaching the control substrate 36.

The main ferrite 23 of the coil device 10 includes the flat plate portion 61 facing the power transmission coil C1, and the connecting portion 65 extending from the end portion of the flat plate portion 61, the end portion facing the sub-ferrite 33. The connecting portion 65 includes the second portion 63 disposed between the sub-ferrite 33 and the sub-base 31. According to this disposition, an electromagnetic field emitted by the power transmission coil C1 can be prevented from reaching the control substrate 36 from a gap between the main ferrite 23 and the sub-ferrite 33.

According to a configuration in which the components that perform electrical functions can be easily removed, it is possible to achieve advantageous effects different from maintenance.

For example, a plurality of the sub-units 3 are prepared. The plurality of sub-units 3 each have different electrical characteristics and constants from each other. Then, the coil device 10 can meet various specifications by attaching suitable sub-units 3 depending on the specifications required for the coil device 10, while keeping the main unit 2 in common. Namely, in order to meet the specifications, it is acceptable if a plurality of types of the sub-units 3 are prepared, and the main unit 2 can adopt a configuration common to the plurality of types of sub-units 3. In addition, even when characteristics of the coil device 10 are changed, it is acceptable if only the sub-unit 3 is replaced. Namely, even when the specification required for the coil device 10 is changed after the coil device 10 is installed, the specification can be met by simply replacing the sub-unit 3 without modifying the main unit 2.

In addition, it may be desired to change the sub-unit 3 as appropriate depending on the type of the power receiver 12 disposed in the movable object V. When it is desired to change the sub-unit 3 as appropriate, it is desirable that an appropriate sub-unit 3 is selected according to the type of the power receiver 12 and is mounted on the main unit 2. Therefore, according to the coil device 10, the configuration of the coil device 10 can be easily changed depending on the type of the power receiver 12 to which electric power is to be supplied.

Subsequently, modification examples of the coil device 10 according to the present embodiment will be described with reference to FIG. 18.

Figure 18A:
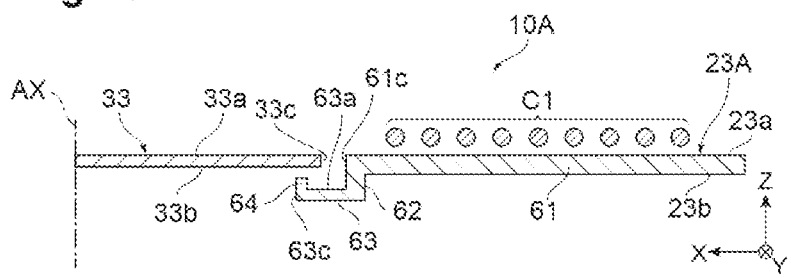
FIG. 18A is a cross-sectional view illustrating a coil device according to a first modification example.
Figure 18B:
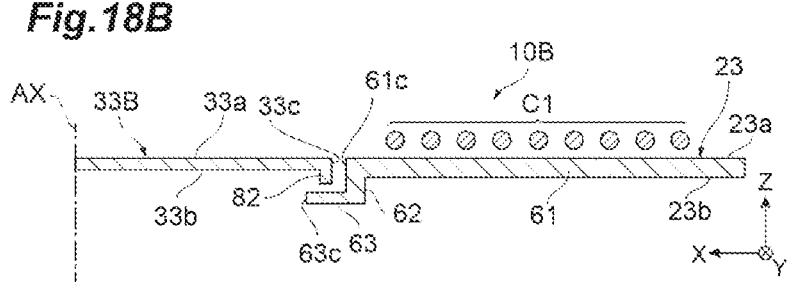
FIG. 18B is a cross-sectional view illustrating a coil device according to a second modification example.

As illustrated in FIG. 18(a), a coil device 10A of a first modification example includes a main ferrite 23A. The main ferrite 23A includes a third portion 64 in addition to the flat plate portion 61, the first portion 62, and the second portion 63. The third portion 64 extends from the tip portion 63c of the second portion 63 toward the sub-ferrite 33. The gap from the second portion 63 to the sub-ferrite 33 can be reduced by including the third portion 64. In addition, as illustrated in FIG. 18(b), a coil device 10B of a second modification example includes a sub-ferrite 33B. The sub-ferrite 33B includes a first portion 82. The first portion 82 protrudes from the inner end portion 33c of the sub-ferrite 33B toward the second portion 63 of the main ferrite 23.

Figure 18C:
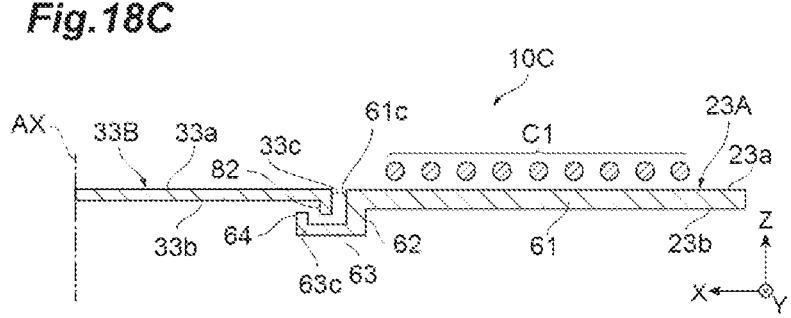
FIG. 18C is a cross-sectional view illustrating a coil device according to a third modification example.

Further, as illustrated in FIG. 18(c), a coil device 10C of a third modification example includes the main ferrite 23A and the sub-ferrite 33B. An electromagnetic field generated from the power transmission coil C1 can be prevented from more reliably entering the magnetic field prohibited region DA (refer to FIG. 6) from a portion at which the main ferrite 23A and the sub-ferrite 33B are separated from each other.

The shapes of the alignment portion 28 and the alignment groove 38 are not limited to the shapes illustrated in the embodiment. In this case, it is acceptable if the shape of the alignment groove 38 corresponds to the shape of the alignment portion 28.

The mode of the accommodation portion P is not limited to the above-described mode. For example, the accommodation portion P may be constituted of a depression formed in a peripheral edge portion of the main cover 22. In addition, the accommodation portion P may be provided outside the power transmission coil C1.

In addition, in the embodiment, the distance Hman [mm] from the main ferrite principal surface 23a to the road surface G is equal to or greater than the distance Hsub [mm] from the sub-ferrite principal surface 33a to the road surface G. However, the distance Hman [mm] from the main ferrite principal surface 23a to the road surface G may be equal to or less than the distance Hsub [mm] from the sub-ferrite principal surface 33a to the road surface G.

REFERENCE SIGNS LIST

10: coil device, 2: main unit, 3: sub-unit, 20H: main housing, 21: main base, 22: main cover, 22e: opening, 23: main ferrite (first magnetic member), 30H: sub-housing, 27: main waterproof connector, 31: sub-base, 32: sub-cover, 33: sub-ferrite (second magnetic member), 36: control substrate (electrical function unit), 37: sub-waterproof connector, 63c: tip portion, 65: connecting portion, C1: power transmission coil (coil), B1: magnetic path (first magnetic path portion), B2: magnetic path (second magnetic path portion), E1: electric component, E2: electronic component, G: road surface (installation target), P: accommodation portion.

The invention claimed is:

1. A coil device comprising:
a main unit including a coil that wirelessly transmits or receives electric power, a main housing that accommodates the coil and is fixed to an installation target, and a first magnetic member forming a first magnetic path portion related to the coil; and
a sub-unit in which an electrical function unit that provides the main unit with an electrical function performed by at least one of an electric component, a sub-housing that is detachably attached to the main housing and accommodates the control substrate, and a second magnetic member forming a second magnetic path portion magnetically connected to the first magnetic path portion,
wherein the main unit includes an accommodation portion that detachably accommodates the sub-unit,
wherein the main housing includes a main base fixed to the installation target and a main cover forming a region for accommodating the coil together with the main base,
wherein the sub-housing includes a sub-base configured to be attached to the main housing and a sub-cover forming a region for accommodating the control substrate together with the sub-base,
wherein the first magnetic member is disposed between the main base and the coil and forms the first magnetic path portion between the main base and the coil, and
wherein the second magnetic member is disposed between the control substrate and the sub-cover and forms the second magnetic path portion between the control substrate and the sub-cover.

2. The coil device according to claim 1, wherein in a state where the sub-unit is attached to the main unit, when viewed in a direction orthogonal to a normal direction of the main cover, the electrical function unit is disposed between the first magnetic member and the main base.

3. The coil device according to claim 1, wherein in a state where the sub-unit is attached to the main unit, when viewed in a direction orthogonal to a normal direction of the main cover, the coil is disposed between the second magnetic member and the sub-cover.

4. The coil device according to claim 1, wherein the first magnetic member includes a flat plate portion facing the coil, and a connecting portion extending from an end portion of the flat plate portion, the end portion facing the second magnetic member, and the connecting portion includes a portion disposed between the second magnetic member and the sub-base.

5. A coil device comprising:
a main unit including a coil that wirelessly transmits or receives electric power, a main housing that accommodates the coil and is fixed to an installation target, and a first magnetic member forming a first magnetic path portion related to the coil; and
a sub-unit including an electrical function unit that provides the main unit with an electrical function performed by at least one of an electric component and an electronic component, a sub-housing that is detachably attached to the main housing and
accommodates the electrical function unit, and a second magnetic member forming a second magnetic path portion magnetically connected to the first magnetic path portion,
wherein the main housing includes a main base fixed to the installation target and a main cover forming a region for accommodating the coil together with the main base and forming a region for detachably accommodating the sub-unit inside the region for accommodating the coil,
wherein the sub-housing includes a sub-base configured to be attached to the main housing and a sub-cover forming a region for accommodating the electrical function unit when attached to the sub-base, and
wherein a first wall portion of the main cover and a first wall portion of the sub-cover are interposed between the first magnetic member and the second magnetic member.

6. A coil device comprising:
a main unit including a coil that wirelessly transmits or receives electric power, a main housing that accommodates the coil and is fixed to an installation target, and a first magnetic member forming a first magnetic path portion related to the coil; and
a sub-unit including an electrical function unit that provides the main unit with an electrical function performed by at least one of an electric component and an electronic component, a sub-housing that is detachably attached to the main housing and accommodates the electrical function unit, and a second magnetic member forming a second magnetic path portion magnetically connected to the first magnetic path portion, wherein the main housing includes a main base fixed to the installation target and a main cover forming a region for accommodating the coil together with the main base and forming a region for detachably accommodating the sub-unit in the region for accommodating the coil, wherein the sub-housing includes a sub-base configured to be attached to the main housing and a sub-cover forming a region for accommodating the electrical function unit when attached to the sub-base, and wherein a first wall portion of the main cover and a first wall portion of the sub-cover are interposed between the first magnetic member and the second magnetic member.

\* \* \* \* \*